(12) United States Patent
Fujikawa et al.

(10) Patent No.: US 7,754,375 B2
(45) Date of Patent: Jul. 13, 2010

(54) LITHIUM ION SECONDARY BATTERY AND METHOD FOR PRODUCING THE SAME

(75) Inventors: Masato Fujikawa, Moriguchi (JP); Hajime Nishino, Ikoma (JP); Mikinari Shimada, Yawata (JP)

(73) Assignee: Panasonic Corporation, Osaka (JP)

( * ) Notice: Subject to any disclaimer, the term of this patent is extended or adjusted under 35 U.S.C. 154(b) by 1040 days.

(21) Appl. No.: 11/363,189

(22) Filed: Feb. 28, 2006

(65) Prior Publication Data

US 2006/0199294 A1 Sep. 7, 2006

(30) Foreign Application Priority Data

Mar. 2, 2005 (JP) .............................. 2005-057801

(51) Int. Cl.
 *H01M 2/14* (2006.01)
(52) U.S. Cl. ................... 429/129; 429/231.95; 429/246
(58) Field of Classification Search ................. 429/129, 429/246

See application file for complete search history.

(56) References Cited

U.S. PATENT DOCUMENTS

| 6,287,720 B1 * | 9/2001 | Yamashita et al. | 429/131 |
| 2003/0087154 A1 * | 5/2003 | Ohzuku et al. | 429/231.1 |
| 2006/0051678 A1 | 3/2006 | Kim et al. | |

FOREIGN PATENT DOCUMENTS

| DE | 101 51 830 A1 | 4/2003 |
| EP | 0 982 790 A1 | 3/2000 |
| EP | 1 696 499 A1 | 8/2006 |
| JP | 06-283205 | 10/1994 |
| JP | 07-201357 | 8/1995 |
| JP | 07-220759 | 8/1995 |
| JP | 09-190814 | 7/1997 |
| JP | 09 237622 | 9/1997 |
| JP | 11-102730 | 4/1999 |
| JP | 2004-119132 | 4/2004 |

(Continued)

OTHER PUBLICATIONS

Search Report dated May 31, 2006 with partial translation.

(Continued)

*Primary Examiner*—Dah-Wei D Yuan
*Assistant Examiner*—Patricia Davis
(74) *Attorney, Agent, or Firm*—McDermott Will & Emery LLP (57) ABSTRACT

Disclosed is a lithium ion secondary battery wherein an active material layer of at least one of positive and negative electrodes, or a separator carries a porous insulating layer, and the surface of the active material layer or separator carrying the porous insulating layer has a first region in which the porous insulating layer is formed and a second region including plural discontinuous deficient hole portions where the porous insulating layer is not formed. When a given reference deficient hole portion is selected from the plural deficient hole portions and a given circle having an area ten times that of the reference deficient hole portion is set on the surface of the active material layer or separator, the area of a part of the second region surrounded by the circle is controlled to not less than 10 $\mu m^2$ and not more than 100 $mm^2$.

22 Claims, 3 Drawing Sheets

FOREIGN PATENT DOCUMENTS

| | | | |
|---|---|---|---|
| JP | 2005-174792 | | 6/2005 |
| JP | 200517492 | * | 6/2005 |
| JP | 2006-040878 | | 2/2006 |
| WO | WO 2005/057691 A1 | | 6/2005 |

OTHER PUBLICATIONS

Supplementary European Search Report issued in European Patent Application No. EP 06714570.6-2119/1780820 PCT/JP2006303431, dated Aug. 10, 2009.

* cited by examiner

LITHIUM ION SECONDARY BATTERY AND METHOD FOR PRODUCING THE SAME

FIELD OF THE INVENTION

The present invention relates to a lithium ion secondary battery having a porous insulating layer for suppressing the expansion of the short circuit portion at the time of occurrence of an internal short circuit. The porous insulating layer is carried on an electrode active material layer or a separator.

BACKGROUND OF THE INVENTION

A sheet-shaped separator is interposed between the positive electrode and the negative electrode of a lithium ion secondary battery. The separator serves to provide an electrical insulation between the positive electrode and the negative electrode, and to retain the electrolyte. A microporous film is used for the separator of the lithium ion secondary battery. The microporous film can be mainly obtained by molding a resin or a resin composition into a sheet, and further drawing it. Although there is no particular limitation with respect to the resin serving as the source material of the microporous film, a polyolefin resin (e.g., polyethylene or polypropylene) is widely used.

A microporous film as described above tends to shrink at high temperatures. Therefore, when an internal short circuit has occurred to cause heat generation, the microporous film shrinks, resulting in the expansion of the short circuit portion. The expansion of the short circuit portion leads to a further generation of reaction heat resulting from short circuit. Accordingly, there is the possibility that the temperature inside the battery may increase abnormally.

Therefore, from the viewpoint of suppressing the expansion of the short circuit portion and to improve the safety of the battery, it has been proposed to form a porous insulating layer including an inorganic filler and a resin binder on the electrode active material layer (Japanese Patent No. 3371301). The porous insulating layer is filled with an inorganic filler. The particles of the filler are bound to one another with a relatively small amount of a resin binder. Accordingly, the porous insulating layer tends not to shrink even at high temperatures. The porous insulating layer has a function for suppressing the expansion of the short circuit portion at the time of occurrence of an internal short circuit.

BRIEF SUMMARY OF THE INVENTION

Like the separator, the porous insulating layer needs to be interposed between the positive electrode and the negative electrode. However, the porous insulating layer includes the resin binder, in addition to the inorganic filler. The resin binder becomes an impediment when lithium ion travels between the positive electrode and the negative electrode. Therefore, the porous insulating layer may cause, for example, an increase in the internal resistance of the battery and deterioration of the discharge performance.

It is an object of the present invention to suppress an increase in the internal resistance and deterioration of the discharge performance in a lithium ion secondary battery in which the electrode active material layer or the separator carries the porous insulating layer.

A first embodiment of the present invention relates to a lithium ion secondary battery comprising: a positive electrode including positive electrode active material layers and a core member carrying the positive electrode active material layers; a negative electrode including negative electrode active material layers and a core member carrying the negative electrode active material layers; and an electrolyte including a non-aqueous solvent, and at least one active material layer of at least one electrode selected from the positive electrode and the negative electrode carries a porous insulating layer.

The surface of the active material layer carrying the porous insulating layer has a first region in which the porous insulating layer is formed and a second region comprising a plurality of discontinuous deficient hole portions where the porous insulating layer is not formed.

Here, when a given reference deficient hole portion is selected from the plurality of deficient hole portions and when a given circle having an area ten times that of the reference deficient hole portion is set on the surface of the active material layer, an area of a part of the second region that is surrounded by the circle is not less than 10 μm$^2$ and not more than 100 mm$^2$.

A second embodiment of the present invention relates to a lithium ion secondary battery comprising: a positive electrode including positive electrode active material layers and a core member carrying the positive electrode active material layers; a negative electrode including negative electrode active material layers and a core member carrying the negative electrode active material layers; a sheet-shaped separator interposed between the positive electrode and the negative electrode; and an electrolyte including a non-aqueous solvent, and the separator carries a porous insulating layer.

The surface of the separator has a first region in which the porous insulating layer is formed and a second region comprising a plurality of discontinuous deficient hole portions where the porous insulating layer is not formed.

Here, when a given reference deficient hole portion is selected from the plurality of deficient hole portions and when a given circle having an area ten times that of the reference deficient hole portion is set on the surface of the separator, an area of a part of the second region that is surrounded by the circle is not less than 10 μm$^2$ and not more than 100 mm$^2$.

In the first and the second embodiments of the present invention, the largest deficient hole portion selected from the plurality of deficient hole portions has an area of not more than 100 mm$^2$.

It is preferable to select a deficient hole portion having an area of not less than 10 μm$^2$ as the reference deficient hole portion.

In the first and the second embodiments of the present invention, it is preferable that the ratio of the total area of deficient hole portions each having an area of not less than 10 μm$^2$ in the second region is not less than 30%.

Furthermore, it is preferable that the distance between two nearest neighboring deficient hole portions having an area of not less than 10 μm$^2$ is not less than two times the maximum width (diameter, in the case where the deficient hole portion is circular) of the larger deficient hole portion of the two.

In the first and the second embodiments of the present invention, it is preferable that the ratio of the area of the second region in the total of the first region and the second region is 3 to 30%.

It is preferable that the porous insulating layer includes an inorganic filler and a resin binder. Alternatively, it is preferable that the porous insulating layer includes a heat-resistant resin.

A third embodiment of the present invention relates to a method for producing a lithium ion secondary battery, comprising the steps of: (a) forming positive electrode active material layers carried on a core member to obtain a positive electrode plate; (b) forming negative electrode active material layers carried on a core member to obtain a negative electrode plate; (c) preparing either a slurry including an inorganic filler and a resin binder, or a slurry including a heat-resistant resin; (d) applying the slurry onto a surface of at least one active material layer of at least one electrode selected from the positive electrode and the negative electrode to form a porous insulating layer; and (e) assembling a battery using the positive electrode plate and the negative electrode plate, after the step (d).

The step (d) comprises forming, on a surface of the active material layer, a first region in which the porous insulating layer is formed and a second region comprising a plurality of discontinuous deficient hole portions where the porous insulating layer is not formed.

In the step (d), the porous insulating layer is formed such that, when a given reference deficient hole portion is selected from the plurality of deficient hole portions and when a given circle having an area ten times that of the reference deficient hole portion is set on the surface of the active material layer, an area of a part of the second region that is surrounded by the circle is set to not less than 10 $\mu m^2$ and not more than 100 $mm^2$.

A fourth embodiment of the present invention relates to a method for producing a lithium ion secondary battery, comprising the steps of: (a) forming positive electrode active material layers carried on a core member to obtain a positive electrode plate; (b) forming negative electrode active material layers carried on a core member to obtain a negative electrode plate; (c) preparing either a slurry including an inorganic filler and a resin binder, or a slurry including a heat-resistant resin; (d) preparing a sheet-shaped separator, and applying the slurry onto a surface of the separator to form a porous insulating layer; and (e) assembling a battery using the positive electrode plate, the negative electrode plate, and the separator carrying the porous heat-resistant layer.

The step (d) comprises forming, on a surface of the separator, a first region in which the porous insulating layer is formed and a second region comprising a plurality of discontinuous deficient hole portions where the porous insulating layer is not formed.

In the step (d), the porous insulating layer is formed such that, when a given reference deficient hole portion is selected from the plurality of deficient hole portions and when a given circle having an area ten times that of the reference deficient hole portion is set on the surface of the separator, an area of a part of the second region that is surrounded by the circle is set to not less than 10 $\mu m^2$ and not more than 100 $mm^2$.

In the third embodiment of the present invention, it is preferable that the step (d) comprises a step (d1) of applying the slurry onto a surface of the active material layer, using a gravure roll having on a surface thereof a region comprising a plurality of discontinuous recesses.

In the fourth embodiment of the present invention, it is preferable that the step (d) comprises a step (d2) of applying the slurry onto a surface of the separator, using a gravure roll having on a surface thereof a region comprising a plurality of discontinuous recesses.

In the gravure roll used in the steps (d1) and (d2), when a given reference recess is selected from the plurality of recesses and when a given circle having an area ten times that of the reference recess is set on the surface of the roll, an area of a part of the region comprising the recesses that is surrounded by the circle is not less than 10 $\mu m^2$ and not more than 100 $mm^2$.

In the third and the fourth embodiments of the present invention, the slurry may include 3 to 50 parts by volume of microcapsules per 100 parts by volume of the inorganic filler or the heat-resistant resin. In this case it is preferable that the step (d) comprises a step (d3) of removing the microcapsules from a coating of the slurry. Preferably, the microcapsules have a particle diameter of 5 to 50 μm.

In the step (d3), it is preferable that the slurry is applied by ink jet printing, gravure coating or spray coating, for example.

According to the present invention, the porous insulating layer has deficient hole portions having appropriate sizes in an appropriate state of distribution. Therefore, the porous insulating layer does not become a great impediment when lithium ion travels between the positive electrode and the negative electrode. Accordingly, it is possible to suppress an increase in the internal resistance or deterioration in discharge performance. Furthermore, since the sizes and the distribution of the deficient hole portions are appropriate, it is also possible to provide an effect resulting from the porous insulating layer of suppressing the expansion of the short circuit portion at the time of occurrence of an internal short circuit.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
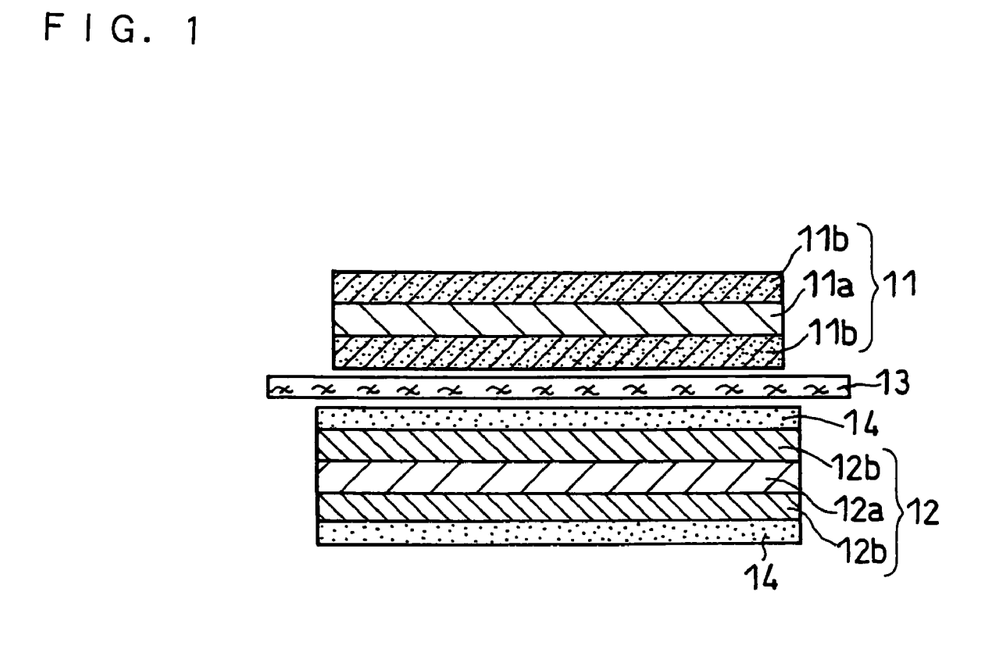
FIG. 1 is a cross-sectional view schematically showing the structure of the electrode group of a lithium ion secondary battery according to a first embodiment of the present invention.

FIG. 1 schematically shows the structure of the electrode group of a lithium ion secondary battery according to the first embodiment. This electrode group includes a positive electrode 11, a negative electrode 12 and a sheet-shaped separator 13 disposed between the positive electrode and the negative electrode. The positive electrode 11 includes positive electrode active material layers 11b and a core member 11a carrying them. The negative electrode 12 includes negative electrode active material layers 12b and a core member 12a carrying them.

The negative electrode active material layers 12b each carry a porous insulating layer 14.

However, the present invention also includes a case where the positive electrode active material layers 11b each carry the porous insulating layer. Furthermore, the present invention also includes a case where both the positive electrode active material layers 11b and the negative electrode active material layers 12b each carry the porous insulating layer.

Moreover, the present invention includes a case where one of the two positive electrode active material layers 11b carried on both sides of the core member 11a and one of the two negative electrode active material layers 12b carried on both sides of the core member 12a carry the porous insulating layer. In this case, the other positive electrode active material layer 11b faces the porous insulating layer carried on the negative electrode active material layer 12b. On the other hand, the other negative electrode active material layer 12b faces the porous insulating layer carried on the positive electrode active material layer 11b.

It should be noted that when the porous insulating layer has a sufficient thickness, it is possible to omit the sheet-shaped separator 13.

Figure 2:
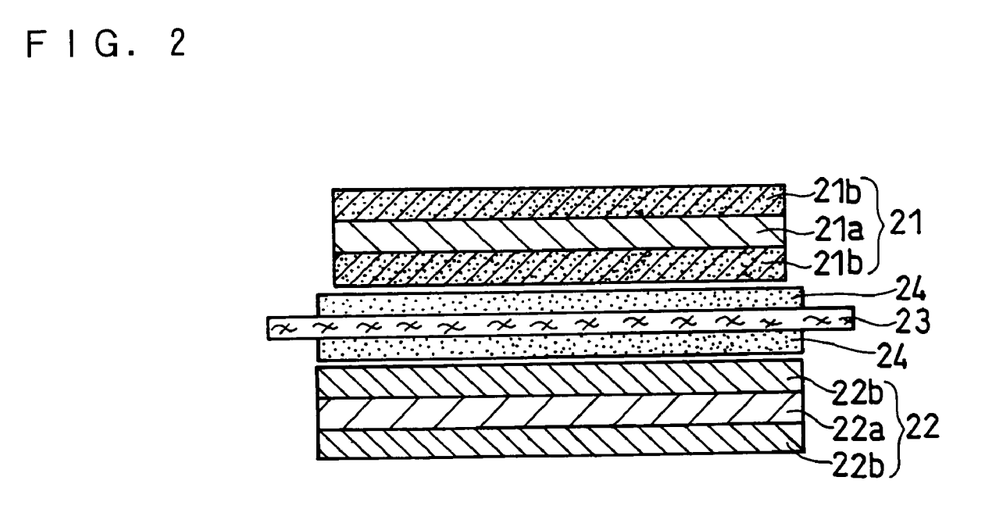
FIG. 2 is a cross-sectional view schematically showing the structure of the electrode group of a lithium ion secondary battery according to a second embodiment of the present invention.

FIG. 2 schematically shows the structure of the electrode group of a lithium ion secondary battery according to the second embodiment. The structure of this electrode group is the same as that shown in FIG. 1, except that the sheet-shaped separator 23 carries porous insulating layers 24. That is, the electrode group of FIG. 2 includes a positive electrode 21, a negative electrode 22 and a sheet-shaped separator 23 disposed between the positive electrode and the negative electrode. The positive electrode 21 includes positive electrode active material layers 21b and a core member 21a carrying them, and the negative electrode 22 includes negative electrode active material layers 22b and a core member 22a carrying them.

The surface of the active material layer or the separator carrying the porous insulating layer has a first region in which the porous insulating layer is formed and a second region comprising plural discontinuous deficient hole portions where the porous insulating layer is not formed.

Figure 3:
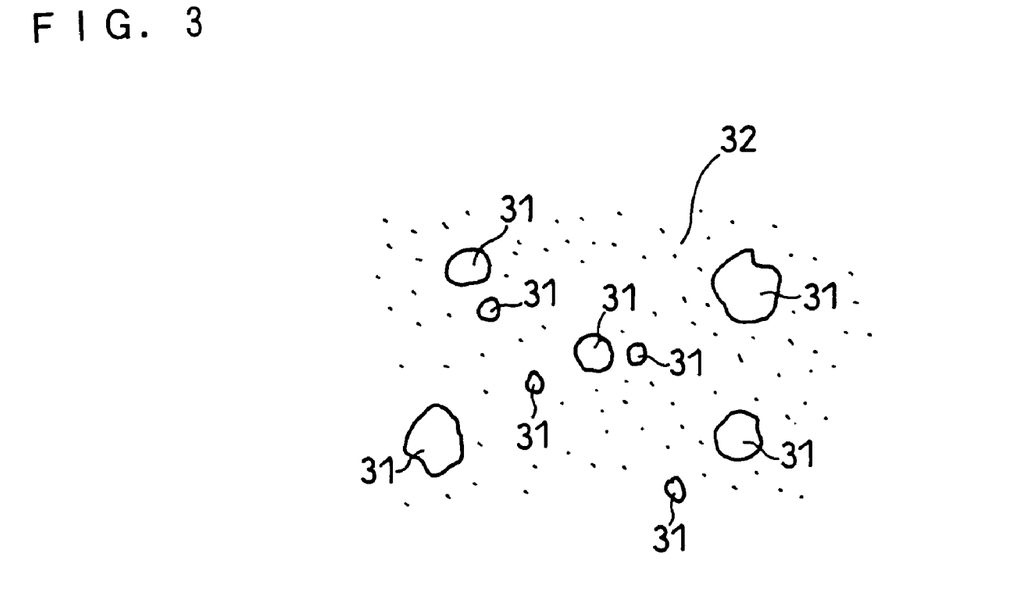
FIG. 3 is a conceptual view showing an example of a top view of a porous insulating layer according to the present invention.

FIG. 3 shows a top view of a porous insulating layer. The base region attached to a porous insulating layer 32 is the first region. Plural deficient hole portions 31 are present through the porous insulating layer 32. Portions of the base region that are exposed at the deficient hole portions 31 constitute the second region. It is preferable that the deficient hole portions 31 are scattered over the entire surface of the porous insulating layer.

The plural deficient hole portions 31 are independent of one another, and discontinuous (in the form of islands). When the plural deficient hole portions 31 are continuous (connected), it is difficult to suppress the expansion of the short circuit portion at the time of occurrence of an internal short circuit.

It is preferable that the second region comprising the plural deficient hole portions is distributed uniformly on the surface of the active material layer or the separator. Uniform distribution of the second region makes it possible to achieve uniform reaction on the surface of the electrode.

Therefore, according to the present invention, a predetermined circle is set on the surface of the active material layer or the separator. The predetermined circle is established on the surface of the active material layer or the separator, only on an assumption. Then, the area of a part of the second region that is surrounded by the circle is controlled to not less than 10 $\mu m^2$ and not more than 100 $mm^2$.

Specifically, a given reference deficient hole portion is selected from the plural deficient hole portions, and a given circle having an area ten times that of the reference deficient hole portion is established on the surface of the active material layer or the separator on an assumption. The area of a part of the second region (the total of all the deficient hole portions) that is surrounded by that circle is controlled to not less than 10 $\mu m^2$ and not more than 100 $mm^2$.

Figure 4:
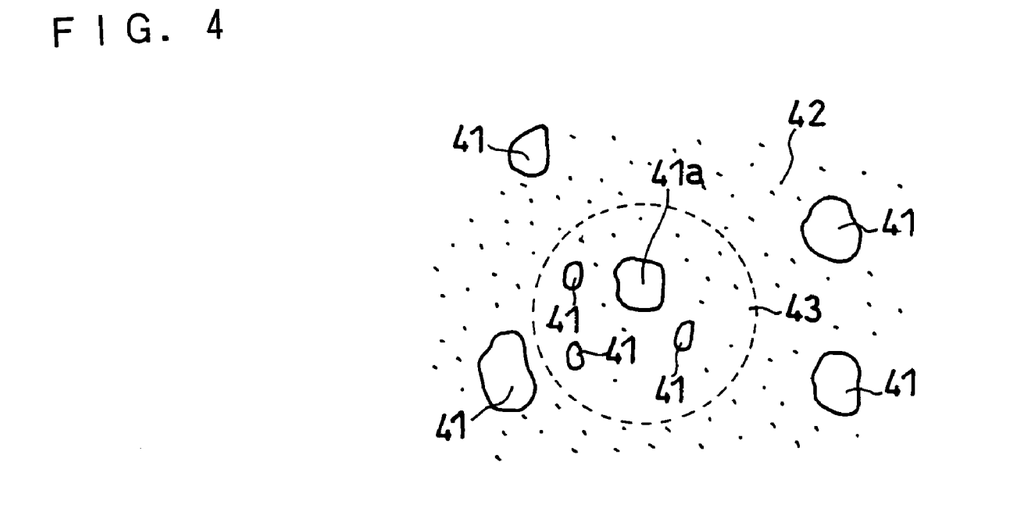
FIG. 4 is a diagram illustrating a case where a circle having an area ten times that of a reference deficient hole portion is set on the surface of a porous insulating layer according to the present invention.

In FIG. 4, a circle 43 having an area ten times that of a reference deficient hole portion 41a is set on a porous insulating layer 42. In addition to the reference deficient hole portion 41a, plural deficient hole portions 41 are scattered in the region surrounded by the circle 43, which is indicated by the dashed line. When the deficient hole portions are localized in the region surrounded by the circle 43, it is difficult to suppress the expansion of the short circuit portion at the time of occurrence of an internal short circuit. That is, heat generation successively occurs through the deficient hole portions, leading to the expansion of the short circuit portion. Or, the deficient hole portions become connected, promoting expansion of the short circuit portion. On the other hand, when the total area of the deficient hole portions 41 included in the region surrounded by the circle 43 is controlled to not more than 100 $mm^2$, successive heat generation is prevented, and the expansion of the short circuit portion is also suppressed. Furthermore, when the above-described total area is set to not less than 10 $\mu m^2$, lithium ion can easily travel between the positive electrode and the negative electrode. Accordingly, the increase in the internal resistance of the battery is suppressed, ensuring a favorable discharge performance.

When each of the deficient hole portions is too large, if an internal short circuit occurs at a particular deficient hole portion, there is the possibility that the short circuit portion will expand over the particular deficient hole portion entirely. In such a case, there is the possibility that the battery will be overheated. Such a possibility can be remarkably reduced by setting the area of the largest deficient hole portion to not more than 100 $mm^2$. Further, the possibility of overheating can be more remarkably reduced by setting the area of the largest deficient hole portion to not more than 20 $mm^2$.

It is preferable that the rate of deficient hole portions having a small area is high, since the uniform reaction can be achieved on the electrode surface. However, from the viewpoint of ensuring favorable discharge characteristics, it is preferable that deficient hole portions having a relatively large area of not less than 10 $\mu m$ are present. Specifically, the ratio of the total area of deficient hole portions having an area of not less than 10 $\mu m^2$ in the total of the second region is preferably not less than 30%, more preferably not less than 50%.

It is desirable that the deficient hole portions having a relatively large area are separated from one another as much as possible. Therefore, the distance between two nearest neighboring deficient hole portions having an area of not less than 10 $\mu m^2$ is preferably not less than two times, more preferably not less than three times the largest width of the larger deficient hole portion of the two. It should be noted that the distance between the deficient hole portions means the distance between the centers of gravity of the deficient hole portions.

The ratio of the area of the second region in the total of the first region and the second region is preferably 3 to 30%, more preferably 5 to 20%. When the ratio of the area of the second region is less than 3%, it is difficult to achieve a remarkable improvement for the discharge characteristics. On the other hand, when the ratio of the area of the second region exceeds 30%, it may be difficult to ensure a sufficient function of the porous insulating layer.

It is preferable that the porous insulating layer includes an inorganic filler and a resin binder. Such a porous insulating layer has an action similar to that of a sheet-shaped separator, but its structure is greatly different from that of a sheet-shaped separator. A sheet-shaped separator comprises a microporous film. The microporous film can be obtained by drawing a resin sheet having low heat resistance. On the other hand, the porous insulating layer including an inorganic filler and a resin binder has a structure in which the particles of the inorganic filler are bonded to one another with the resin binder. The tensile strength in the plane direction of such a porous insulating layer is lower than that of the sheet-shaped separator.

For example, the content of the resin binder in the total of the inorganic filler and the resin binder in the porous insulating layer is preferably 1 to 10 wt %, more preferably 2 to 5 wt %.

There is no particular limitation with respect to the inorganic filler. As the inorganic filler, it is possible to use a commonly used powder or particulate matter. These may include either primary particles or secondary particles. Secondary particles are formed by primary particles that are aggregated by a van der Waals force, for example. In addition, an inorganic filler including particles of indefinite form in which plural (e.g., about 2 to 10, preferably 3 to 5) primary particles are bonded to one another can also be preferably used.

Figure 5:
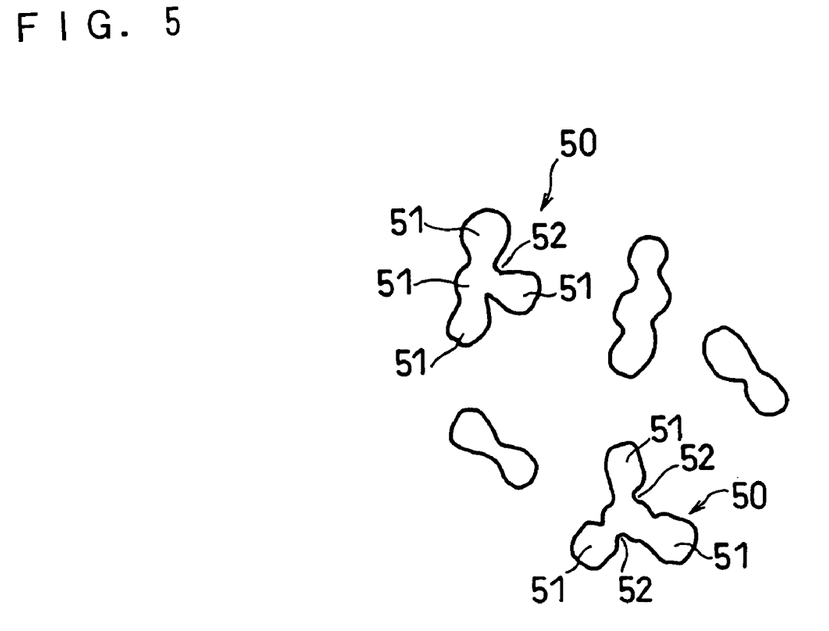
FIG. 5 is a conceptual view showing an example of particles of indefinite form that are included in an inorganic filler.

FIG. 5 schematically shows an example of particles of indefinite form. Each particle of indefinite form 50 comprises plural primary particles 51 that are bonded to one another. A neck 52 is formed between each pair of the primary particles that are bonded to each other. Each of the primary particles usually comprises a single crystal, so that each of the particles of indefinite form 50 is always a polycrystalline particle. A polycrystalline particle comprises plural primary particles that are diffusion bonded to one another.

As the inorganic filler, it is preferable to use a metal oxide. As the metal oxide, it is possible to use, for example, titanium oxide, aluminum oxide, zirconium oxide, tungsten oxide, zinc oxide, magnesium oxide and silicon oxide. These may be used alone or in combination of two or more of them. Among them, in terms of the chemical stability, aluminum oxide (alumina) and magnesium oxide (magnesia) are preferable, and $\alpha$-alumina is particularly preferable.

In the case of using an inorganic filler comprising the particles of indefinite form, the maxim particle diameter of the primary particles is preferably not more than 4 µm, more preferably not more than 1 µm. It should be noted that when the primary particles cannot be clearly identified in the particles of indefinite form, the diameter of the thickest part of the knot of the particles of indefinite form can be considered as the particle diameter of the primary particles. When the diameter of the primary particles exceeds 4 µm, the porosity of the porous insulating layer is difficult to be ensured, or the electrode plate may be difficult to be bent.

Usually, the particles of indefinite form can be obtained by partly melting the primary particles by heating, and bonding them. In this case, the maximum particle diameter of the primary particles of the source material can be considered as the maximum particle diameter of the primary particles constituting the particles of indefinite form. The particle size distribution of the primary particles of the source material can be measured, for example, with a wet-type laser particle size distribution measurement apparatus manufactured by Microtrac Inc. In this case, 99% value ($D_{99}$) on a volume basis of the primary particles can be considered as the maximum particle diameter of the primary particles. It should be noted that the particle diameter of the primary particles hardly changes when heating is performed to such a degree that the primary particles are diffusion bonded to one another.

The maximum particle diameter of the primary particles can also be determined, for example, from a SEM picture or a transmission electron microscope (TEM) picture of the particles of indefinite form. In this case, the particle diameters of at least 1000 primary particles are measured, and the maximum value of them is determined as the maximum particle diameter.

The average particle diameter of the primary particles can also be measured in the same manner as described above. For example, in the particle size distribution of the primary particles of the source material, 50% value (median value: $D_{50}$) on a volume basis of the primary particles of the source material can be considered as the average particle diameter of the primary particles. Alternatively, the particle diameters of at least 1000 primary particles are measured from a SEM picture or a TEM picture of the particles of indefinite form, and the average value of them is determined. The average particle diameter of the primary particles is preferably 0.05 µm to 1 µm.

It is desirable that the average particle diameter of the particles of indefinite form is not less than two times the average particle diameter of the primary particles, and not more than 10 µm. Further, from the viewpoint of achieving a porous insulating layer capable of maintaining a high porosity over a long period, it is more preferable that the average particle diameter of the particles of indefinite form is not less than three times the average particle diameter of the primary particles, and not more than 5 µm.

The average particle diameter of the particles of indefinite form can also be measured, for example, with a wet-type laser particle size distribution measurement apparatus manufactured by Microtrac Inc. In this case, 50% value on a volume basis (median value: $D_{50}$) of the particles of indefinite form can be considered as the average particle diameter of the particles of indefinite form. When the average particle diameter of the particles of indefinite form is less than two times the average particle diameter of the primary particles, the porous insulating layer may be excessively dense. On the other hand, when the average particle diameter of the particles of indefinite form exceeds 10 µm, the porosity of the porous insulating layer may be excessive (e.g., above 80%), so that their structure may be brittle.

Although there is no particular limitation with respect to the material of the resin binder, examples include a polyacrylic acid derivative, polyvinylidene fluoride (PVDF), polyethylene, styrene-butadiene rubber, polytetrafluoroethylene (PTFE) and a tetrafluoroethylene-hexafluoropropylene copolymer (FEP). These may be used alone or in combination of two or more of them.

In a lithium ion secondary battery, an electrode group in which a positive electrode and a negative electrode are wound is mainly used. In order to construct such an electrode group having a wound structure, the porous insulating layer, which is caused to adhere to the surface of the electrode plate, needs to be flexible. From the viewpoint of providing flexibility to the porous insulating layer, it is preferable to use a polyacrylic acid derivative or a polyacrylonitrile derivative as the resin binder. It is preferable that these derivatives include at least one selected from the group consisting of a methyl acrylate unit, an ethyl acrylate unit, a methyl methacrylate unit and an ethyl methacrylate unit in addition to an acrylic acid unit or/and an acrylonitrile unit.

It is also possible to use a porous insulating layer including a heat-resistant resin, in place of the porous insulating layer including the inorganic filler and the resin binder. The heat-resistant resin has a glass transition temperature, a melting point and a thermal decomposition starting temperature that are sufficiently high, so that it has a sufficient mechanical strength at high temperatures. It is preferable that the heat-resistant resin has a heat deformation temperature of not less than 260° C. Here, "heat deformation temperature" refers to a deflection temperature under load determined under a load of 1.82 MPa in accordance with the testing method ASTM-D648 of American Society for Testing and Materials. The higher the heat deformation temperature is, the easier it is for the resin to maintain the shape at high temperatures. While the temperature inside an overheated battery can increase to about 180° C., a heat-resistant resin having a heat deformation temperature of not less than 260° C. is stable even in such a battery. It is also preferable that the heat-resistant resin has a glass transition temperature (Tg) of not less than 130° C.

From the viewpoint of increasing the durability, the porous insulating layer including the heat-resistant resin may additionally include the above-described inorganic filler. However, from the viewpoint of achieving a porous insulating layer having well-balanced durability and flexibility, the content of the inorganic filler is preferably less than 80 wt %, more preferably 25 to 75 wt % of the porous insulating layer.

The heat-resistant resin may be processed into fibers and used as a filler. As the binder for the filler comprising the heat-resistant resin, it is possible to use the resin binders like those used for the porous insulating layer including the inorganic filler.

Specific examples of the heat-resistant resin include, aramid (aromatic polyamide), polyamide imide, polyimide and cellulose. These may be used alone or in combination of two or more of them, or may be used in combination with other resins.

It should be noted that the porous insulating layer including the inorganic filler and the resin binder and the porous insulating layer including the heat-resistant resin may be used in combination, and these may be laminated, for example.

In the case of not using the sheet-shaped separator, the thickness of the porous insulating layer carried on the active material layer is preferably 1 to 25 μm, more preferably 5 to 20 μm, for example. On the other hand, in the case of using the sheet-shaped separator, the thickness of the porous insulating layer carried on the active material layer is preferably 1 to 20 μm, more preferably 3 to 15 μm. The thickness of the porous insulating layer carried on the sheet-shaped separator is preferably 1 to 20 μm, more preferably 3 to 15 μm.

For the sheet-shaped separator, a microporous film can be preferably used. The microporous film can be obtained, for example, by molding a resin or a resin composition into a sheet, and further drawing it. While there is no particular limitation with respect to the resin serving as the source material of the microporous film, a polyolefin resin (e.g., polyethylene or polypropylene) is preferable. The thickness of the sheet-shaped separator is preferably 5 to 20 μm.

While there is no particular limitation with respect to the core member of the positive electrode, an aluminum foil and an aluminum alloy foil can be preferably used, for example. Although there is no particular limitation with respect to the core member of the negative electrode, a copper foil, a copper alloy foil, a nickel-plated iron foil and a stainless steel foil can be preferably used, for example. The core member may be subjected to punching or embossing.

The positive electrode active material layer includes a positive electrode active material as the essential component, and includes, for example, a binder, a conductive agent and a thickener as optional components. The negative electrode active material layer includes a negative electrode active material as the essential component, and includes, for example, a binder, a conductive agent and a thickener as optional components. As the material for these components, it is possible to use those used as the materials for a lithium ion secondary battery, without any particular limitation.

Although there is no particular limitation with respect to the positive electrode active material, it is preferable to use a lithium composite oxide, including, for example, a lithium-containing transition metal oxide such as lithium cobaltate, lithium nickelate or lithium manganate. It is also preferable to use a modified product in which the transition metal in the lithium-containing transition metal oxide is partly replaced by another element. For example, it is preferable to replace the cobalt in lithium cobaltate by aluminum, magnesium or the like. It is preferable to replace the nickel in lithium nickelate by cobalt, manganese or the like. The lithium composite oxides may be used alone or in combination of two or more of them.

While there is no particular limitation with respect to the negative electrode active material, it is preferable to use, for example, a carbon material such as natural graphite or artificial graphite, a metal material such as silicon or tin, or an alloy material such as a silicon alloy or a tin alloy. These materials may be used alone or in combination of two or more of them.

As the electrolyte, it is preferable to use a non-aqueous solvent in which a lithium salt is dissolved.

Although there is no particular limitation with respect to the non-aqueous solvent, for example, it is possible to use: carbonic acid esters such as ethylene carbonate (EC), propylene carbonate (PC), dimethyl carbonate (DMC), diethyl carbonate (DEC) and ethylmethyl carbonate (EMC); carboxylic acid esters such as γ-butyrolactone, γ-valerolactone, methyl formate, methyl acetate and methyl propionate; and ethers such as dimethyl ether, diethyl ether and tetrahydrofuran. The non-aqueous solvent may be used alone or in combination of two or more of them. Among them, it is particularly preferable to use carbonic acid esters.

While there is no particular limitation with respect to the lithium salt, it is preferable to use $LiPF_6$ and $LiBF_4$, for example. These may be used alone or in combination.

In order to ensure the safety at the time of overcharge, it is preferable to add, to the electrolyte, a small amount of an additive that forms a good coating on the positive electrode and/or the negative electrode. Specific examples of the additive include vinylene carbonate (VC), vinyl ethylene carbonate (VEC) and cyclohexylbenzene (CHB).

Next, an example of the method for producing the lithium ion secondary battery according to the present invention will be described.

The production method according to the present invention includes a step of preparing a slurry including an inorganic filler and a resin binder, or a slurry including a heat-resistant resin. The slurry is prepared by dissolving or dispersing an inorganic filler and a resin binder, or a heat-resistant resin in a liquid component. The liquid component is selected according to the type of the inorganic filler, the resin binder or the heat-resistant resin, without any particular limitation. For example, it is possible to use water, N-methyl-2-pyrrolidone and cyclohexanone. The boiling point of the liquid component is preferably not more than 200° C.

The viscosity of the slurry is preferably 40 to 200 P (poise) at 25° C., since this is suitable for forming deficient hole portions. In the case of forming the porous insulating layer from a slurry having a viscosity in such a range, bubbles with a suitable size can be easily formed in a coating of the slurry. Preferable deficient hole portions are formed where the bubbles with a suitable size burst. From the same viewpoint, the solid content in the slurry is preferably 30 to 70 wt %. Furthermore, the speed of applying the slurry is preferably 15 to 100 m/min. In addition, the temperature for drying the coating of the slurry is preferably 100 to 250° C., and the temperature rising rate at drying is preferably 5 to 50° C./sec.

In the case where the porous insulating layer is carried on the active material layer, the slurry is applied onto the surface of the active material layer of at least one selected from the positive electrode and the negative electrode. In the case where the porous insulating layer is carried on the sheet-shaped separator, the slurry is applied onto the surface of the separator. At this time, the application needs to be performed such that the above-described first region and second region are formed on the surface of the active material layer or the sheet-shaped separator. By drying the coating of the slurry, a porous insulating layer is formed.

It should be noted that although the positive electrode and the negative electrode may be produced in any production method without any particular limitation, the electrode plate is generally produced by forming the active material layers carried on the core member. The electrode plates are cut into a predetermined shape, as necessary. While there is no particular limitation with respect to the method for forming the active material layer carried on the core member, the active material layer is generally formed by dissolving or dispersing the active material and other materials in a liquid component to prepare a paste, applying the paste onto the core member, and drying the coating.

Then, a battery is assembled using the positive electrode plate and the negative electrode plate. There is no particular limitation with respect to the method for assembling the battery. In the case of fabricating a cylindrical battery for example, the positive electrode and the negative electrode are wound with the porous insulating layer and/or the sheet-shaped separator disposed between the electrodes, thus forming an electrode group. Thereafter, the electrode group is housed in a battery case, together with the electrolyte. In the case of fabricating a square battery, the electrode group is formed such that it has a cross section close to an elliptical shape.

There is no particular limitation with respect to the method for applying the slurry onto the surface of the active material layer or the sheet-shaped separator such that the above-described first region and second region are formed. However, it is preferable to perform the application using a gravure roll having on its surface a region comprising recesses corresponding to the desired pattern of the first region.

Plural discontinuous recesses are formed on the surface of the gravure roll. In the case of selecting a given reference recess from those recesses, and setting a given circle having an area ten times that of the reference recess on the surface of the roll, the area of a part of the region comprising the recesses that is surrounded by that circle is set to not less than 10 $\mu m^2$ and not more than 100 $mm^2$.

The slurry including the source material of the porous insulating layer may include 3 to 50 parts by volume of microcapsules per 100 parts by volume of the inorganic filler or the heat-resistant resin. In this case, plural deficient hole portions can be formed by removing the microcapsules from the coating of the slurry. The portions that are left after removal of the microcapsules form deficient hole portions. With this method, it is possible to uniformly form deficient hole portions having a uniform size over the whole porous insulating layer. The distribution of the deficient hole portions can be readily controlled with the ratio between the inorganic filler and the microcapsules. The particle diameter of the microcapsules may be selected according to the desired size of the deficient hole portions. For example, microcapsules having a particle diameter of 5 to 50 $\mu m$ are readily available.

It should be noted that "microcapsules" refer to hollow particles having a diameter of several $\mu m$ to several tens $\mu m$. For example, when the hollow particles comprise a low melting point resin, the hollow particles (microcapsules) are melted by heating the coating of the slurry, thus forming the deficient hole portions.

As long as the formation of the above-described first region and second region is not impeded, it is possible to use other various slurry application methods other than the above-described method. The slurry may be applied, for example, by a continuous application process such as die coating or offset printing, a plotting process using ink jet nozzles, and a spray coating process.

In the case of offset printing for example, the slurry is transferred from a roller to a transfer member, and the slurry is transferred from that transfer member to the surface of the active material layer or the sheet-shaped separator. In this case, recesses in a pattern corresponding to the second region are formed in advance on the surface of the roller. Thus, it is possible to transfer a porous insulating layer having deficient hole portions to the transfer member.

In the case of the plotting process using ink jet nozzles, the nozzles are arranged with a desired interval, and the slurry is discharged while scanning the nozzles vertically and horizontally above the active material layer or the sheet-shaped separator. Thus, it is possible to form plural deficient hole portions in various patterns.

In the following, the present invention will be specifically described by way of examples, but the present invention is not limited to the following examples.

EXAMPLES

Example 1

(i) Production of Positive Electrode

A positive electrode material mixture paste was prepared by stirring, with a double arm kneader, 3 kg of lithium cobaltate having an average particle diameter of 3 $\mu m$, 1 kg of "#1320 (trade name)" (an N-methyl-2-pyrrolidone (NMP) solution containing 12 wt % of polyvinylidene fluoride) manufactured by KUREHA CORPORATION, 90 g of acetylene black and a suitable amount of NMP. This paste was applied onto both sides of a 15 $\mu m$ thick aluminum foil serving as a core member (positive electrode current collector), followed by drying to give a positive electrode plate. Then, the positive electrode plate was rolled to have a total thickness of 160 $\mu m$. The rolled positive electrode plate was cut into a width that could be inserted into a 18650 size cylindrical battery case, thereby obtaining a positive electrode.

(ii) Production of Negative Electrode

A negative electrode material mixture paste was prepared by stirring, with a double arm kneader, 3 kg of artificial graphite having an average particle diameter of 20 $\mu m$, 75 g of "BM-400B(trade name)" (a water dispersion containing 40 wt % of a styrene-butadiene copolymer) manufactured by ZEON Corporation, 30 g of carboxymethyl cellulose (CMC) and a suitable amount of water. This paste was applied onto both sides of a 10 $\mu m$ thick copper foil serving as a core member (negative electrode current collector), followed by drying to give a negative electrode plate. Then, the negative electrode plate was rolled to have a total thickness of 180 $\mu m$. The rolled negative electrode plate was cut into a width that could be inserted into a 18650 size cylindrical battery case, thereby obtaining a negative electrode.

(iii) Formation of Porous Insulating Layer

A slurry including an inorganic filler and a resin binder was prepared by stirring, with a double arm kneader, 950 g of alumina having a volume-based average particle diameter (median diameter) of 0.3 μm, 625 g of "BM-720H (trade name)" (an NMP solution containing 8 wt % of a polyacrylonitrile derivative) manufactured by ZEON Corporation and 1 kg of NMP. The viscosity of the obtained slurry at 25° C. measured in accordance with a vibration method was 60 P.

Figure 6:
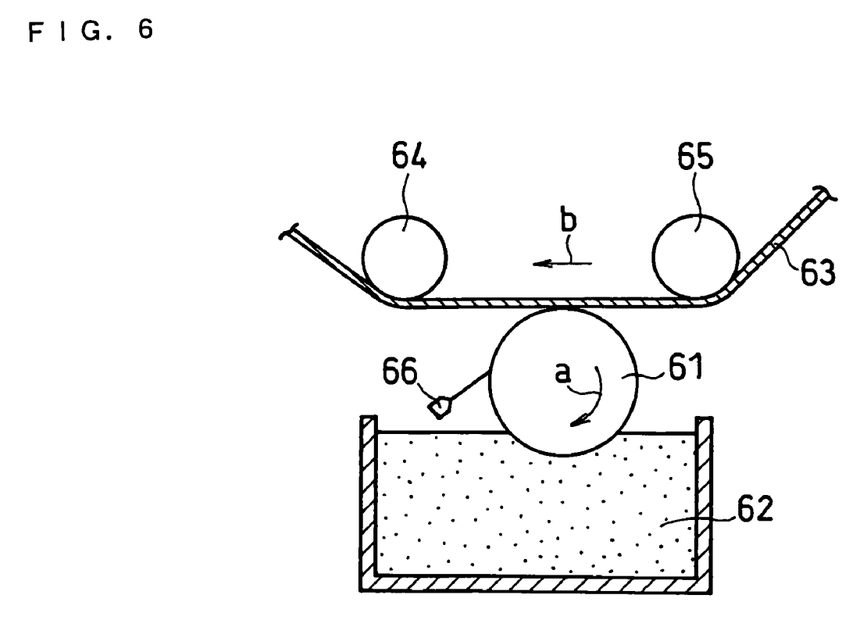
FIG. 6 is a cross-sectional view schematically showing a coating apparatus including a gravure roll.

Then, using a coating apparatus including a gravure roll 61 as shown in FIG. 6, the obtained slurry was applied onto the surface of the active material layers on both sides of the negative electrode, and the coating was dried to form a porous insulating layer. The coating apparatus includes a gravure roll 61, a reservoir that is filled with a slurry 62 and is disposed below the gravure roll 61, a blade 66 for removing an excess slurry from the surface of the gravure roll 61, and auxiliary rollers 64 and 65 for transporting the negative electrode. A part of the gravure roll 61 is brought into contact with the liquid surface of the slurry 62.

The gravure roll 61 was provided with plural circular recesses that are uniformly distributed over the entire surface of the roll. The area per recess was set to 50 μm$^2$ (diameter: about 8 μm). The total area of all the recesses included in the region surrounded by a given circle having an area (500 μm$^2$) ten times that of a single recess was within the range of 50 to 80 μm$^2$. Additionally, the pitch of the recesses was set to 12 μm, and the distance between nearest neighboring recesses (the distance between the centers of the recesses) was set to 20 μm.

The gravure roll 61 was rotated in the direction indicated by the arrow a in FIG. 6. On the liquid surface of the slurry 62, excess slurry 62 was caused to adhere to the surface of the roll, and the excess slurry was scraped off with the blade 66. Thereafter, the slurry remaining on the surface of the gravure roll 61 was transferred onto the surface of the active material layer of a negative electrode 63 being transported by the auxiliary rollers 64 and 65 in the direction indicated by the arrow b. When the application of the slurry to one of the active material layers was completed, the slurry was subsequently applied onto the other active material layer. Then, the coating of the slurry was dried at 150° C., thus forming porous insulating layers carried on the active material layers on both sides of the negative electrode. The thickness of the each porous insulating layer was controlled to 5 μm.

A first region in which the porous insulating layer was formed and a second region comprising plural circular deficient hole portions each having an area of 50 μm$^2$ were formed on the surface of each of the negative electrode active material layers. The ratio of the area of the second region in the total of the first region and the second region was 13%. In addition, an observation of the surface of the porous insulating layers with a SEM (scanning electron microscope) confirmed that the area per recess on the surface of the gravure roll and the area per deficient hole portion substantially matched.

(iv) Fabrication of Battery

The positive electrode and the negative electrode, which had the porous insulating layers carried on its both sides, were wound with a 20 μm thick sheet-shaped separator made of a polyethylene microporous film disposed between the electrodes, thus obtaining a columnar electrode group. This electrode group was housed in a cylindrical battery case, together with 5.5 g of an electrolyte. Thereafter, the battery case was sealed, completing a 18650 size cylindrical lithium ion secondary battery having a design capacity of 2000 mAh.

The electrolyte was prepared by dissolving LiPF$_6$ at a concentration of 1 mol/L in a mixed solvent comprising ethylene carbonate (EC), dimethyl carbonate (DMC) and ethylmethyl carbonate (EMC) at a weight ratio of 2:2:5. 3 wt % of vinylene carbonate (VC) was added to the electrolyte.

(v) Charge/Discharge Characteristics

The battery of Example 1 was subjected to the preliminary charge/discharge twice, and stored for seven days under an environment with 45° C. Thereafter, the discharge capacity was determined by performing charge/discharge tests under an environment with 20 under the following two sets of conditions.

(Conditions 1)
Constant current charge
    charge current value: 1400 mA, end-of-charge voltage: 4.2 V
Constant voltage charge
    charge voltage value: 4.2 V, end-of-charge current: 100 mA
Constant current discharge
    discharge current value: 400 mA, end-of-discharge voltage: 3 V (Conditions 2)
Constant current charge
    charge current value: 1400 mA, end-of-charge voltage: 4.2 V
Constant voltage charge
    charge voltage value: 4.2 V, end-of-charge current 100 mA
Constant current discharge
    discharge current value: 4000 mA, end-of-discharge voltage: 3 V (vi) Nail Penetration Test The battery whose charge/discharge characteristics had been evaluated was subjected to charging as follows, under an environment with 20° C.

Constant current charge
    charge current value: 1400 mA, end-of-charge voltage: 4.25 V
Constant voltage charge
    charge voltage value: 4.25 V, end-of-charge current: 100 mA An iron nail having a diameter of 2.7 mm was allowed to penetrate into the charged battery from its side at a speed of 5 mm/sec under an environment with 20° C., and the temperature reached after one second and the temperature reached after 90 seconds in the vicinity of the penetrated part of the battery were measured.

(vii) Evaluation Results

The discharge capacity during the 400 mA discharge was 1980 mAh, the discharge capacity during the 4000 mA discharge was 1850 mAh, the temperature reached after one second was 70° C., and the temperature reached after 90 seconds was 90° C. These results confirmed that the battery of Example 1 could avoid overheating when an internal short circuit was forcefully caused by the nail penetration test, and that the battery of Example 1 had excellent discharge characteristics.

Example 2

A 18650 size cylindrical lithium ion secondary battery having a design capacity of 2000 mAh was fabricated in the same manner as Example 1, except that the porous insulating layers were carried on both sides of the sheet-shaped separator, instead of being carried on the surface of the negative electrode active material layers, and the battery was evaluated in the same manner as Example 1.

The discharge capacity during the 400 mA discharge was 1972 mAh, the discharge capacity during the 4000 mA discharge was 1845 mAh, the temperatures reached after one second and 90 seconds from the nail penetration were 78° C. and 102° C. These results confirmed that the battery of Example 2 could also avoid overheating when an internal short circuit was forcefully caused by the nail penetration test, and that the battery of Example 2 had excellent discharge characteristics.

Example 3

18650 size cylindrical lithium ion secondary batteries having a design capacity of 2000 mAh were fabricated in the same manner as Example 1, except that gravure rolls with different surface conditions were used in the production process of the porous insulating layer.

Specifically, the area per recess (S1) was varied as shown in Table 1. Further, the pitch for forming the recesses was varied. Here, the total area (S2) of all the recesses included in the region surrounded by a given circle having an area ten times that of each recess, the distance (T) between nearest neighboring recesses (the distance between the centers of the recesses), and the ratio (R) of the area of the second region in the total of the first region and the second region were varied as shown in Table 1.

The obtained batteries were evaluated in the same manner as Example 1. The results are shown in Table 2.

TABLE 1

| Sample No. | S1 | S2 | T | R |
|---|---|---|---|---|
| 1 | 3 μm² | less than 10 μm² | 5 μm | 13% |
| 2 | 3 μm² | less than 10 μm² | 4 μm | 20% |
| 3 | 5 μm² | less than 10 μm² | 8 μm | 9% |
| 4 | 20 μm² | 10-100 μm² | 10 μm | 20% |
| 5 | 30 μm² | 10-100 μm² | 15 μm | 15% |
| 6 | 50 μm² | 10-100 μm² | 12 μm | 40% |
| 7 | 100 μm² | 100-10000 μm² | 80 μm | 2% |
| 8 | 200 μm² | 100-10000 μm² | 40 μm | 13% |
| 9 | 300 μm² | 100-10000 μm² | 60 μm | 10% |
| 10 | 0.1 mm² | less than 1 mm² | 0.8 mm | 23% |
| 11 | 0.3 mm² | less than 1 mm² | 1.5 mm | 13% |
| 12 | 0.5 mm² | less than 1 mm² | 2 mm | 15% |
| 13 | 3 mm² | 1-20 mm² | 3 mm | 33% |
| 14 | 10 mm² | 1-20 mm² | 8 mm | 20% |
| 15 | 20 mm² | 1-20 mm² | 15 mm | 9% |
| 16 | 27 mm² | 20-50 mm² | 12 mm | 23% |
| 17 | 27 mm² | 20-50 mm² | 40 mm | 1% |
| 18 | 50 mm² | 20-50 mm² | 20 mm | 13% |
| 19 | 60 mm² | 50-100 mm² | 27 mm | 9% |
| 20 | 75 mm² | 50-100 mm² | 20 mm | 20% |
| 21 | 90 mm² | 50-100 mm² | 16 mm | 40% |
| 22 | 110 mm² | greater than 100 mm² | 36 mm | 10% |
| 23 | 150 mm² | greater than 100 mm² | 35 mm | 15% |
| 24 | 150 mm² | greater than 100 mm² | 28 mm | 23% |

TABLE 2

| Sample No. | 400 mA discharge capacity (mAh) | 4000 mA discharge capacity (mAh) | Temp. after 1 sec. (° C.) | Temp. after 90 sec. (° C.) |
|---|---|---|---|---|
| 1 | 1951 | 1750 | 68 | 88 |
| 2 | 1962 | 1773 | 69 | 92 |
| 3 | 1962 | 1762 | 68 | 90 |
| 4 | 1980 | 1835 | 70 | 89 |
| 5 | 1981 | 1842 | 73 | 94 |

TABLE 2-continued

| Sample No. | 400 mA discharge capacity (mAh) | 4000 mA discharge capacity (mAh) | Temp. after 1 sec. (° C.) | Temp. after 90 sec. (° C.) |
|---|---|---|---|---|
| 6 | 1983 | 1880 | 89 | 102 |
| 7 | 1963 | 1801 | 74 | 92 |
| 8 | 1987 | 1843 | 76 | 94 |
| 9 | 1984 | 1830 | 77 | 90 |
| 10 | 1980 | 1743 | 82 | 98 |
| 11 | 1978 | 1832 | 72 | 88 |
| 12 | 1981 | 1838 | 73 | 87 |
| 13 | 1982 | 1867 | 87 | 104 |
| 14 | 1979 | 1842 | 75 | 94 |
| 15 | 1980 | 1843 | 72 | 91 |
| 16 | 1986 | 1850 | 77 | 93 |
| 17 | 1947 | 1785 | 69 | 89 |
| 18 | 1977 | 1865 | 78 | 94 |
| 19 | 1973 | 1851 | 80 | 93 |
| 20 | 1982 | 1882 | 82 | 98 |
| 21 | 1988 | 1886 | 87 | 118 |
| 22 | 1984 | 1895 | 90 | 120 |
| 23 | 1985 | 1902 | 95 | 126 |
| 24 | 1981 | 1930 | 96 | 138 |

Example 4

Recesses having an area per recess of 50 μm² and recesses having an area per recess of 1 mm² were both formed on the surface of a gravure roll such that the ratios (R') of the total area of deficient hole portions having an area per recess of not less than 1 mm² in the second region had the values shown in Table 3. Except for this, 18650 size cylindrical lithium ion secondary batteries having a design capacity of 2000 mAh were fabricated in the same manner as Example 1.

The distance between nearest neighboring recesses having an area per recess of 1 mm² was set to not less than 2.5 mm. The distance between nearest neighboring recesses having an area per recess of 50 μm² was set to not less than 20 μm. The distance between nearest neighboring recesses having an area of 1 mm² and 50 μm² respectively was set to not less than 2.5 mm².

However, the total area of all the recesses included in a region surrounded by a given circle that includes the recess having an area of 50 μm² and has an area (500 μm²) ten times the area per recess was set to 50 to 120 μmm². The total area of all the recesses included in a region surrounded by a given circle that includes the recess having an area of 1 mm² and has an area (10 mm²) ten times the area per recess was set to 1 to 2.4 mm².

The obtained batteries were evaluated in the same manner as Example 1. The results are shown in Table 3.

TABLE 3

| Sample No. | R' (%) | 400 mA discharge capacity (mAh) | 4000 mA discharge capacity (mAh) | Temp. after 1 sec. (° C.) | Temp. after 90 sec. (° C.) |
|---|---|---|---|---|---|
| 25 | 5 | 1975 | 1840 | 70 | 83 |
| 26 | 10 | 1973 | 1838 | 68 | 84 |
| 27 | 25 | 1982 | 1847 | 71 | 84 |
| 28 | 50 | 1980 | 1872 | 74 | 87 |
| 29 | 75 | 1983 | 1885 | 78 | 90 |
| 30 | 100 | 1979 | 1882 | 75 | 93 |

Example 5

In the production of the porous insulating layer, 20 parts by volume of microcapsules having a particle diameter of 5 μm, per 100 parts by volume of the alumina, were added to a slurry including an inorganic filler and a resin binder that had been prepared in the same manner as Example 1, and the whole was further sufficiently mixed with a double arm kneader.

The obtained slurry was applied onto both sides of the negative electrode active material layers by die coating, followed by drying the slurry at 150° C., thus forming a porous insulating layers carried on the active material layers on both sides of the negative electrode. It should be noted that, the microcapsules were melted by heat during the drying, thus forming deficient hole portions. The thickness of the porous insulating layer was controlled to 5 μm.

Consequently, a first region in which the porous insulating layer was formed and a second region comprising plural circular deficient hole portions each having an area of 75 μm$^2$ were formed on the surface of each of the negative electrode active material layers. The ratio of the area of the second region in the total of the first region and the second region was 15%. Further, the total area of all the deficient hole portions included in the region surrounded by a given circle having an area ten times that of a single deficient hole portion was 75 to 150 μm$^2$, and the distance between nearest neighboring deficient hole portions was 10 μm.

A 18650 size cylindrical lithium ion secondary battery having a design capacity of 2000 mAh was fabricated in the same manner as Example 1, except that the above-mentioned porous insulating layers were carried on the surfaces of the negative electrode active material layers, and the battery was evaluated in the same manner as Example 1.

The discharge capacity during the 400 mA discharge was 1977 mAh, the discharge capacity during the 4000 mA discharge was 1846 mAh, the temperature reached after one second and 90 second from the nail penetration were 70° C. and 87° C. These results confirmed that the battery of Example 5 could also avoid overheating when an internal short circuit was forcefully caused by the nail penetration test, and that the battery of Example 5 had excellent discharge characteristics.

Example 6

18650 size cylindrical lithium ion secondary batteries having a design capacity of 2000 mAh were fabricated in the same manner as Example 1, except that the inorganic fillers or the heat-resistant resin shown in Table 4 were used in the formation of the porous insulating layer.

In the case of the inorganic fillers, slurries were prepared in the same manner as Example 1, except that the inorganic filler was changed. In the case of the heat-resistant resin, on the other hands, a slurry including polyamide imide was prepared in the following manner, and the temperature for drying the coating of the slurry was changed to 80° C.

<Preparation of Slurry Including Polyamide Imide>

First, 21 g of trimellitic anhydride monochloride and 20 g of diamine (diamino diphenyl ether) were added to 1 kg of NMP, and the whole was mixed at room temperature to prepare a slurry including polyamic acid having a polyamic acid concentration of 3.9 wt %. When drying the coating of the slurry, the polyamic acid is cyclodehydrated to form polyamide imide. In addition, the heat deformation temperature (deflection temperature under load) of the polyamide imide measured in accordance with the ASTM was 280° C.

The obtained batteries were evaluated in the same manner as Example 1. The results are shown in Table 4.

TABLE 4

| Sample No. | Inorganic filler or heat-resistant resin | 400 mA discharge capacity (mAh) | 4000 mA discharge capacity (mAh) | Temp. after 1 sec. (° C.) | Temp. after 90 sec. (° C.) |
|---|---|---|---|---|---|
| 31 | magnesia | 1982 | 1842 | 76 | 80 |
| 32 | zirconia | 1975 | 1865 | 72 | 81 |
| 33 | silica | 1977 | 1850 | 69 | 84 |
| 34 | polyamide imide | 1980 | 1860 | 73 | 91 |

These results confirmed that the batteries of Example 6 could avoid overheating when an internal short circuit was forcefully caused by the nail penetration test, and that the batteries of Example 6 had excellent discharge characteristics.

Example 7

18650 size cylindrical lithium ion secondary batteries having a design capacity of 2000 mAh were fabricated in the same manner as Example 2, except that the inorganic fillers or heat-resistant resins shown in Table 5 were used in the formation of the porous insulating layer. The slurries prepared in the same manner as in Example 6 were used, except for the one using aramid as the heat-resistant resin. Further, the temperature for drying the coating of the slurry including polyamide imide was set to 80° C. In the case of using aramid as the heat-resistant resin, on the other hand, the slurry was prepared in the manner described below. The temperature for drying the coating of the slurry including aramid was also set to 80° C.

<Preparation of Slurry Including Aramid>

First, 65 g of dry anhydrous calcium chloride was added to 1 kg of NMP, and the mixture was heated to 80° C. in a reaction vessel to completely dissolve the anhydrous calcium chloride. After the obtained NMP solution of calcium chloride was cooled down to room temperature, 32 g of paraphenylendiamine was added to the solution, and completely dissolved therein. Thereafter, the reaction vessel was placed in a constant temperature room at 20° C., and 58 g of dichloroterephthalate was added dropwise to the NMP solution over one hour. Then, the NMP solution was stood still for one hour in the constant temperature room at 20° C. to allow a polymerization reaction to proceed, thus synthesizing polyparaphenylene terephthalamide (hereinafter, abbreviated as "PPTA"). After completion of the reaction, the NMP solution (polymerized solution) was moved from the constant temperature room into a vacuum room, and degassed while stirring for 30 minutes under reduced pressure. Further, the obtained polymerized solution was diluted with an NMP solution of calcium chloride to prepare a slurry including aramid with a PPTA concentration of 1.4 wt %.

In addition, after the slurry including aramid was carried onto both sides of the separator and dried at 80° C., the coating of aramid was sufficiently washed, together with the separator, with pure water to remove the calcium chloride. Consequently, micro pores were formed in the coating of aramid, thus forming porous insulating layer. The heat deformation temperature (deflection temperature under load) of the aramid resin measured in accordance with the ASTM was 321° C.

The obtained batteries were evaluated in the same manner as Example 1. The results are shown in Table 5.

TABLE 5

| Sample No. | Inorganic filler or heat-resistant resin | 400 mA discharge capacity (mAh) | 4000 mA discharge capacity (mAh) | Temp. after 1 sec. (° C.) | Temp. after 90 sec. (° C.) |
|---|---|---|---|---|---|
| 35 | magnesia | 1979 | 1860 | 72 | 88 |
| 36 | zirconia | 1983 | 1865 | 76 | 90 |
| 37 | silica | 1979 | 1846 | 75 | 93 |
| 38 | aramid | 1968 | 1871 | 76 | 95 |
| 39 | polyamide imide | 1980 | 1849 | 74 | 89 |

These results confirmed that the batteries of Example 7 could avoid overheating when an internal short circuit was forcefully caused by the nail penetration test, and that the batteries of Example 7 had excellent discharge characteristics.

The present invention is useful for high-performance lithium ion secondary batteries that are required to provide both a high level of safety and high discharge characteristics. The lithium ion secondary battery of the present invention is particularly useful as a power source for portable devices or the like.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A lithium ion secondary battery comprising:
   a positive electrode including positive electrode active material layers and a core member carrying said positive electrode active material layers;
   a negative electrode including negative electrode active material layers and a core member carrying said negative electrode active material layers; and
   an electrolyte including a non-aqueous solvent,
   wherein at least one active material layer of at least one electrode selected from said positive electrode and said negative electrode carries a porous insulating layer,
   a surface of said active material layer carrying said porous insulating layer has (1) a first region in which said porous insulating layer is formed and (2) a second region comprising a plurality of discontinuous deficient hole portions where said porous insulating layer is not formed, and
   when a given reference deficient hole portion is selected from said plurality of deficient hole portions and when a given circle having an area ten times that of said reference deficient hole portion is set on said surface of said active material layer, an area of a part of said second region that is surrounded by said circle is not less than 10 $\mu m^2$ and not more than 100 $mm^2$,
   the ratio of the area of the second region in the total of the first region and the second region being 5 to 30%.

2. A lithium ion secondary battery comprising:
   a positive electrode including positive electrode active material layers and a core member carrying said positive electrode active material layers;
   a negative electrode including negative electrode active material layers and a core member carrying said negative electrode active material layers;
   a sheet-shaped separator interposed between said positive electrode and said negative electrode; and
   an electrolyte including a non-aqueous solvent,
   wherein said separator carries a porous insulating layer,
   a surface of said separator has (1) a first region in which said porous insulating layer is formed and (2) a second region comprising a plurality of discontinuous deficient hole portions where said porous insulating layer is not formed, and
   when a given reference deficient hole portion is selected from said plurality of deficient hole portions and when a given circle having an area ten times that of said reference deficient hole portion is set on said surface of said separator, an area of a part of said second region that is surrounded by said circle is not less than 10 $\mu m^2$ and not more than 100 $mm^2$,
   the ratio of the area of the second region in the total of the first region and the second region being 5 to 30%.

3. The lithium ion secondary battery in accordance with claim 1,
   wherein the largest deficient hole portion selected from said plurality of deficient hole portions has an area of not more than 100 $mm^2$.

4. The lithium ion secondary battery in accordance with claim 2,
   wherein the largest deficient hole portion selected from said plurality of deficient hole portions has an area of not more than 100 $mm^2$.

5. The lithium ion secondary battery in accordance with claim 1,
   wherein said reference deficient hole portion has an area of not less than 10 $\mu m^2$.

6. The lithium ion secondary battery in accordance with claim 2,
   wherein said reference deficient hole portion has an area of not less than 10 $\mu m^2$.

7. The lithium ion secondary battery in accordance with claim 1,
   wherein the ratio of the total area of deficient hole portions each having an area of not less than 10 $\mu m^2$ in said second region is not less than 30%.

8. The lithium ion secondary battery in accordance with claim 2,
   wherein the ratio of the total area of deficient hole portions each having an area of not less than 10 $\mu m^2$ in said second region is not less than 30%.

9. The lithium ion secondary battery in accordance with claim 7,
   wherein a distance between nearest neighboring two deficient hole portions each having an area of not less than 10 $\mu m^2$ is not less than two times the width of the larger deficient hole portion of the two.

10. The lithium ion secondary battery in accordance with claim 8,
    wherein a distance between nearest neighboring two deficient hole portions each having an area of not less than 10 $\mu m^2$ is not less than two times the width of the larger deficient hole portion of the two.

11. The lithium ion secondary battery in accordance with claim 1,
    wherein said porous insulating layer includes an inorganic filler and a resin binder, or alternatively includes a heat-resistant resin.

12. The lithium ion secondary battery in accordance with claim 2,
wherein said porous insulating layer includes an inorganic filler and a resin binder, or alternatively includes a heat-resistant resin.

13. The lithium ion secondary batter in accordance with claim 1,
wherein the ratio of the total area of deficient hole portions having an area of not less than 10 $\mu m^2$ in the total of the second region is not less than 30%.

14. The lithium ion secondary battery in accordance with claim 2,
wherein the ratio of the total area of deficient hole portions having an area of not less than 10 $\mu m^2$ in the total of the second region is not less than 30%.

15. The lithium ion secondary battery in accordance with claim 1,
wherein the distance between two nearest neighboring deficient hole portions having an area of not less than 10 $\mu m^2$ is not less than two times the largest width of the largest deficient hole portion of the two.

16. The lithium ion secondary battery in accordance with claim 2,
wherein the distance between two nearest neighboring deficient hole portions having an area of not less than 10 $\mu m^2$ is not less than two times the largest width of the larger deficient hole portion of the two.

17. The lithium ion secondary batter in accordance with claim 1,
wherein said porous insulating layer includes an inorganic filler and a resin binder, said inorganic filler including particles of indefinite form in which plural primary particles are bonded to one another.

18. The lithium ion secondary batter in accordance with claim 2,
wherein said porous insulating layer includes an inorganic filler and a resin binder, said inorganic filler including particles of indefinite form in which plural primary particles are bonded to one another.

19. The lithium ion secondary battery in accordance with claim 1,
wherein said porous insulating layer includes a heat-resistant resin, said heat-resistant resin is aramid, polyamide imide or polyimide.

20. The lithium ion secondary battery in accordance with claim 2,
wherein said porous insulating layer includes a heat-resistant resin, and said heat-resistant resin is aramid, polyamide imide or polyimide.

21. The lithium ion secondary battery in accordance with claim 1,
wherein said porous insulating layer includes an inorganic filler and a resin binder, and the content of said resin binder in said porous insulating layer is 1 to 10 wt. % and the remaining portion thereof consists of said inorganic filler.

22. The lithium ion secondary batter in accordance with claim 2,
wherein said porous insulating layer includes an inorganic filler and a resin binder, and the content of said resin binder in said porous insulating layer is 1 to 10 wt % and the remaining portion thereof consists of said inorganic filler.

* * * * *